July 13, 1943.  E. K. KÜHN  2,324,403
EXTENSION STEM FOR VEHICLE HANDLEBARS
Filed March 30, 1942
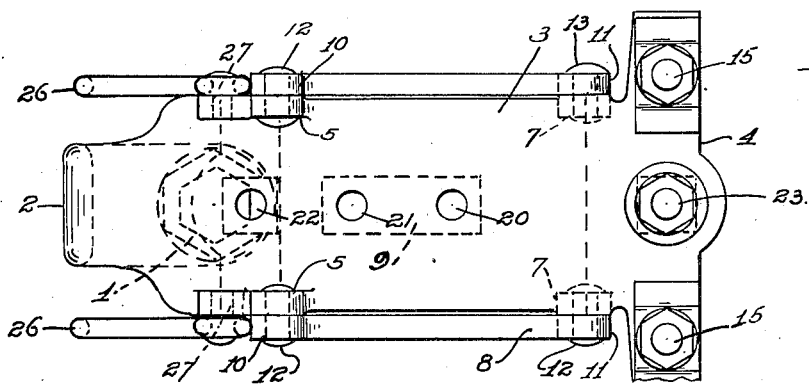
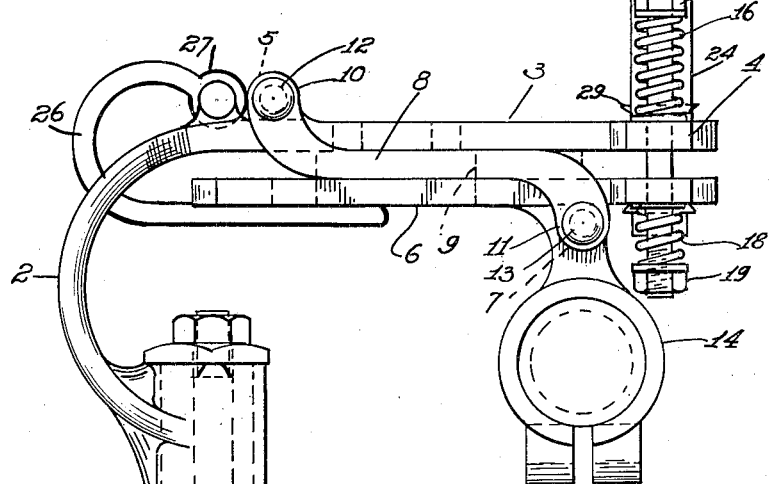
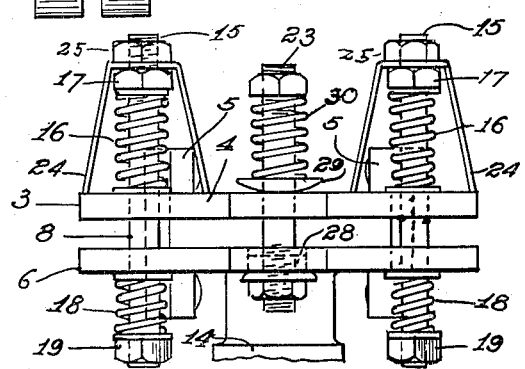
Inventor:
Ernst Karl Kühn
by H. J. Sanders
his Attorney Patented July 13, 1943

2,324,403

UNITED STATES PATENT OFFICE 2,324,403

EXTENSION STEM FOR VEHICLE HANDLE BARS

Ernst Karl Kühn, New York, N. Y.

Application March 30, 1942, Serial No. 436,861

5 Claims. (Cl. 74—551.2)

This invention relates to improvements in resilient extension stems for bicycles, motorcycles and the like, and more particularly to mechanisms adapted to serve as shock absorbers for the handlebars thereof. One object is to provide a resilient extension stem adapted for use in connection with handlebars of different types and styles, the mechanism being adjustable or variable readily to suit the particular type of handlebar in use.

With handlebars of the racer, ram's-horn or vertical type there will be one adjustment of the stem extension structure while with the horizontal type of handlebar there will be another adjustment, said adjustments being instantly and easily made by the operator.

With the foregoing and other objects in view the invention consists in the combination and arrangement of parts to be hereinafter fully described, pointed out in the claims and illustrated in the accompanying drawing which forms a part of this patent, and in which—

Fig. 1 is a top plan view of the extension stem.

Fig. 2 is a view of Fig. 1 in side elevation illustrating its application to the bicycle steering post, and, Fig. 3 is an end view of Fig. 1.

Like reference characters denote corresponding parts throughout the several views.

The present extension stem includes two resiliently connected plates, one of which is connected by an extension to the bicycle steering post and the other to the handlebars by the handlebar clamp, the means connecting the plates being in part adjustable to make them adapted to use in connection with handlebars of different types. The reference numeral 1 denotes the steering post of a bicycle which is formed with an upwardly and forwardly curved resilient extension 2 that terminates in or is secured to a top flat plate 3 that is formed with a wide termination 4, said plate being formed with ears 5, 5 at its rear end, said ears being disposed opposite each other either above or below the lateral edges of the plate.

Spaced below the plate 3 and of substantially the same size and shape is a flat plate 6 formed near its forward end with a pair of oppositely disposed ears 7. Interposed between said plates 3 and 6 is a connecting plate 8 formed substantially centrally with an elongated perforation 9 and with two pairs of ears 10 and 11, the former pair being in juxtaposed relation to the ears 5 and connected thereto pivotally by pins 12, the pair of ears 11 being in abutting relation to the ears 7 and pivotally secured thereto by the pins 13.

Depending from the plate 6 is the clamp 14 for the handlebars, not shown, disposed forwardly of the post 1. Connecting the plates 3, 6 at their forward ends are the threaded bolts 15, 15, each of which is provided above the plate 3 with an expansion coil spring 16 held in position by a nut 17 and washer, the lower end of each spring abutting the plate. Arranged upon the lower end of each bolt 15 is a spring 18 one end of which abuts the plate 6 and the other being engaged by a nut 19 and washer, said springs 16, 18 being of different strengths.

Extending longitudinally of the plates 3, 6 are the spaced perforations 20, 21, 22, the perforations 20, 21 being in line with the elongated perforation 9 in the connecting plate. Extending through the plates 3 and 6 between the bolts 15, 15 is a bolt 23 held in place by a spring 30 and nut 30'. Thimbles 24 resting upon the plate 3 receive said bolts 15, 15; each held in position by a nut 25. The bolt 23 serves to bind the forward ends of the plates 3, 6 together, said bolt being readily removable for removable insertion selectively in the perforations 20, 21 or 22 and when passing through a perforation 20 or 21 passing also through the elongated perforation 9 of the connecting plate. The bolt adjustment thus described serves to regulate the spread or resiliency of the unit formed by said plates. A shackle spring 26 connected to the ears 27 of plate 3 connects said plate to the lower plate 6.

This spring, when used, contributes to the resiliency of the unit. As the bolt 23 is moved rearwardly of the plates 3, 6 the resiliency or shock-absorbing capacity of the unit formed by the said plates and their connections is reduced. The thimbles 24 prevent the spring 16 from being compressed by jolts of the vehicle, permitting the shock to be taken up by the compression of the lower springs 18. The removable thimbles 24 are employed when strong spring resistance is desired and removed when lighter spring resistance is desired, as when vertical or racer type handlebars are used. The shackle spring 26 also is employed when vertical or racer type handlebars are used but spring 26 would probably not be desired with horizontal or ladies' type handlebars. The spring bolt 23 may not be used when racer or vertical handlebars are employed.

What is claimed is:

1. In a shock absorber for bicycle handlebars or the like, a pair of plates, one of said plates being connected to the handlebar clamp and the other to the steering post, means connecting said plates for yieldingly retaining them in predetermined spaced relation, said means including a pair of oppositely disposed bolts, and springs arranged upon said bolts upon opposite sides of said plates, the springs upon opposite plate sides being of different strengths.

2. In a shock absorber for bicycle handlebars and the like, a pair of plates, one of said plates carrying the handlebar clamp and the other being connected to the steering post, bolts connecting said plates, springs upon said bolts engaging said plates, a bolt adjustable longitudinally and centrally of said plates, a shackle spring connecting the rear ends of said plates together, and an insert plate connecting said plates intermediate their ends.

3. In a shock absorber for bicycle handlebars and the like, a pair of plates, one of said plates carrying the handlebar clamp and the other being connected to the steering post, bolts connecting said plates, springs upon said bolts engaging said plates, a bolt adjustable longitudinally and centrally of said plates, a shackle spring connecting the rear ends of said plates together, an insert plate connecting said plates intermediate their ends, and thimbles arranged upon the first named bolts and resting upon one of said plates.

4. In a shock absorber for bicycle handlebars and the like, a pair of spaced plates, one of said plates being connected to the handlebar clamp and the other to the steering post, an insert plate disposed between said first named plates, bolts connecting said first named plates, springs upon said bolts connecting said plates, a bolt adjustable longitudinally and centrally of said plates, and a shackle spring connecting said first named plates together.

5. In a shock absorber for bicycle handlebars and the like, a pair of spaced plates connected to the handlebar clamp and to the steering post, an insert plate disposed between said first named plates, springs of different strengths upon said bolts abutting said plates, a bolt connecting said first named plates and adjustable longitudinally thereof, and a shackle spring connecting said first named plates.

ERNST KARL KÜHN.